United States Patent
Mahé et al.

(10) Patent No.: US 12,511,919 B2
(45) Date of Patent: Dec. 30, 2025

(54) METHOD FOR CLASSIFYING A SEQUENCE OF INPUT IMAGES REPRESENTING A PARTICLE IN A SAMPLE OVER TIME

(71) Applicants: BIOMERIEUX, Marcy L'Etoile (FR); BIOASTER, Lyons (FR)

(72) Inventors: Pierre Mahé, Lans en Vercors (FR); Meriem El Azami, L'Arbresle (FR); Elodie Degout-Charmette, Toussieux (FR); Zohreh Sedaghat, La Mulatiere (FR); Quentin Josso, Lyons (FR); Fabian Rol, La Verpilliere (FR)

(73) Assignees: BIOMERIEUX, Marcy l'Etoile (FR); BIOASTER, Lyons (FR)

( * ) Notice: Subject to any disclaimer, the term of this patent is extended or adjusted under 35 U.S.C. 154(b) by 337 days.

(21) Appl. No.: 18/032,399

(22) PCT Filed: Oct. 19, 2021

(86) PCT No.: PCT/FR2021/051817
§ 371 (c)(1),
(2) Date: Apr. 18, 2023

(87) PCT Pub. No.: WO2022/084616
PCT Pub. Date: Apr. 28, 2022

(65) Prior Publication Data
US 2023/0386233 A1 Nov. 30, 2023

(30) Foreign Application Priority Data
Oct. 20, 2020 (FR) ...................................... 2010744

(51) Int. Cl.
*G06V 20/69* (2022.01)
*G06V 10/77* (2022.01)
*G06V 10/82* (2022.01)

(52) U.S. Cl.
CPC ........ *G06V 20/698* (2022.01); *G06V 10/7715* (2022.01); *G06V 10/82* (2022.01)

(58) Field of Classification Search
CPC ... G06V 20/698; G06V 10/7715; G06V 10/82
See application file for complete search history.

(56) References Cited

U.S. PATENT DOCUMENTS 10,831,156 B2 11/2020 Douet et al.
2020/0272805 A1* 8/2020 Flanagan ............. G06V 10/764

FOREIGN PATENT DOCUMENTS

| WO | WO-2012/021802 A2 | 2/2012 | |
|---|---|---|---|
| WO | WO-2017/207184 A1 | 12/2017 | |
| WO | WO-2021194580 A2 * | 9/2021 | ......... C12N 15/1089 |

OTHER PUBLICATIONS

Yang et al., "NuSeT: A deep learning tool for reliably separating and analyzing crowded cells" (pp. 1-20) (Year: 2020).*

(Continued)

*Primary Examiner* — Manav Seth
(74) *Attorney, Agent, or Firm* — Harness, Dickey & Pierce PLC

(57) ABSTRACT

A method for classifying a sequence of input images representing a target particle in a sample over time, includes the following steps performed by the data processing of a client, namely: (b) concatenation of the input images in the sequence as a three-dimensional stack; (c) direct classification of the three-dimensional stack using a convolutional neural network, CNN.

12 Claims, 6 Drawing Sheets

(56) References Cited

OTHER PUBLICATIONS

Li et al., "RNA3DCNN: Local and global quality assessments of Rna 3D structures using 3D deep convolutional neural networks" (pp. 1-18) (Year: 2018).*
Translation of International Search Report for PCT application No. PCT/FR2021/051817 (Feb. 23, 2022).
INPI Search Report and Written Opinion for French application No. FR2010744 (Jun. 17, 2021).
Bliznuks, D., et al., "Embedded neural network system for microorganisms growth analysis," Proc. of SPIE, vol. 11457 (Apr. 9, 2020).
Hay, E., et al., "Performance of convolutional neural networks for identification of bacteria in 3D microscopy datasets," PLoS Comput. Biol., vol. 14, No. 12 (Dec. 3, 2018).
Yu, H., et al., "Phenotypic Antimicrobial Susceptibility Testing with Deep Learning Video Microscopy," Anal. Chem., vol. 90, No. 10, pp. 6314-6322 (Apr. 20, 2018).
Kim, M., "Principles and techniques of digital holographic microscopy," SPIE Reviews, vol. 1, pp. 018005-1-018005-50 (May 17, 2010).
Choi, J., et al., "A rapid antimicrobial susceptibility test based on single-cell morphological analysis," American Association for the Advancement of Science (2014).

* cited by examiner

| Layer (type) | Output Shape | Param # |
| --- | --- | --- |
| conv3d_1 (Conv3D) | (None, 125, 125, 5, 30) | 570 |
| activation_1 (Activation) | (None, 125, 125, 5, 30) | 0 |
| max_pooling3d_1 (MaxPooling3 | (None, 62, 62, 2, 30) | 0 |
| conv3d_2 (Conv3D) | (None, 62, 62, 2, 60) | 32460 |
| activation_2 (Activation) | (None, 62, 62, 2, 60) | 0 |
| max_pooling3d_2 (MaxPooling3 | (None, 12, 12, 1, 60) | 0 |
| flatten_1 (Flatten) | (None, 8640) | 0 |
| dense_1 (Dense) | (None, 100) | 864100 |
| dense_2 (Dense) | (None, 2) | 202 |

Total params: 897,332
Trainable params: 897,332
Non-trainable params: 0

None

FIG. 5

METHOD FOR CLASSIFYING A SEQUENCE OF INPUT IMAGES REPRESENTING A PARTICLE IN A SAMPLE OVER TIME

CROSS-REFERENCE TO RELATED APPLICATIONS

This application is a national phase entry of PCT Patent Application Serial No. PCT/FR2021/051817 filed on Oct. 19, 2021, which claims priority to French Patent Application Serial No. FR2010744 filed on Oct. 20, 2020, both of which are incorporated by reference herein.

TECHNICAL FIELD

The present invention relates to the field of optical acquisition of biological particles. The biological particles can be microorganisms such as bacteria, fungi or yeasts, for example. This can also include cells, multicellular organisms, or any other particle of the polluting particle type, including dust.

The invention is particularly advantageously applicable for analyzing the state of a biological particle, for example, in order to know the metabolic state of a bacterium following the application of an antibiotic. The invention allows, for example, an antibiogram to be produced of a bacterium.

BACKGROUND

An antibiogram is a laboratory technique aimed at testing the phenotype of a bacterial strain with respect to one or more antibiotic(s). An antibiogram is conventionally produced by cultivating a sample containing bacteria and an antibiotic.

European patent application No. 2603601 describes a method for producing an antibiogram by visualizing the state of the bacteria after an incubation period in the presence of an antibiotic. In order to visualize the bacteria, the bacteria are marked by fluorescent markers that allow their structures to be revealed. Measuring the fluorescence of the markers then makes it possible to determine whether the antibiotic has effectively acted on the bacteria.

The conventional process for determining the effective antibiotics on a bacterial strain involves taking a sample containing said strain (for example, from a patient, an animal, a food batch, etc.) and then sending the sample to an analysis center. When the analysis center receives the sample, it firstly proceeds with cultivation of the bacterial strain in order to obtain at least one colony thereof, with the cultivation ranging between 24 hours and 72 hours. It then prepares several samples from this colony comprising various antibiotics and/or various concentrations of antibiotics, then incubates the samples once again. After a new cultivation duration that also ranges between 24 and 72 hours, each sample is manually analyzed in order to determine whether the antibiotic has acted effectively. The results are then returned to the practitioner in order to apply the antibiotic and/or the most effective antibiotic concentration.

However, the marking process is particularly long and complex to perform and these chemical markers have a cytotoxic effect on the bacteria. It follows that this mode of visualization does not allow the bacteria to be observed at several instants of the cultivation of the bacteria, hence the need to use a long enough cultivation time, of the order of 24 to 72 hours, to guarantee the reliability of the measurement. Other methods for visualizing biological particles use a microscope, allowing a non-destructive measurement of a sample.

Digital Holographic Microscopy (DHM) is an imaging technique that allows the depth of field constraints of conventional optical microscopy to be overcome. Schematically, it involves recording a hologram formed by the interference between the light waves diffracted by the observed object and a reference wave having a spatial coherence. This technique is described in the review article by Myung K. Kim entitled, "Principles and techniques of digital holographic microscopy", published in SPIE Reviews, Vol. 1, No. 1, January 2010.

Recently, the use of digital holographic microscopy has been proposed for identifying microorganisms in an automated manner. Thus, international application WO 2017/207184 describes a method for acquiring a particle integrating a simple acquisition without focusing associated with a digital reconstruction of the focusing, allowing a biological particle to be observed while limiting the acquisition time.

Typically, this solution allows the structural modifications of a bacterium in the presence of an antibiotic to be detected after incubation of only around ten minutes, as well as its sensitivity at the end of two hours (detection of the presence or absence of a division or of a pattern coding the division), unlike the conventional process described above that can take several days. Indeed, since the measurements are non-destructive, it is possible to carry out analyses very early on in the cultivation process without risking destroying the sample and therefore prolonging the analysis time.

It is even possible to track a particle on several successive images so as to form a film representing the evolution of a particle over time (since the particles are not altered after the first analysis), in order to visualize its behavior, for example, its speed of movement or its cellular division process.

Therefore, it is understood that the visualization method yields excellent results. The difficulty lies in the interpretation of these images or this film in its own right if the intention is, for example, to reach a conclusion concerning the susceptibility of a bacterium to the antibiotic present in the sample, in particular in an automatic manner.

Various techniques have been proposed, ranging from simply counting bacteria over time to the 'morphological' analysis aimed at detecting particular "configurations" by image analysis. For example, when a bacterium prepares for division, two poles appear in the distribution, long before the division itself, which results in two distinct portions of the distribution.

The article by Choi J., Yoo J., Lee M., et al (2014) entitled, "A rapid antimicrobial susceptibility test based on single cell morphological analysis", *Science Translational Medicine*, 6(267), https://doi.org/10.1126/scitranslmed.3009650, proposes combining the two techniques in order to evaluate an antibiotic effect. However, as highlighted by the authors, their approach requires highly accurate calibration of a certain number of thresholds that strongly depend on the nature of the morphological changes caused by the antibiotics.

More recently, the article by Yu H., Jing W., Iriya R., et al (2018) entitled, "Phenotypic Antimicrobial Susceptibility Testing with Deep Learning Video Microscopy", Analytical Chemistry, 90(10), 6314-6322, https://doi.org/10.1021/acs.analchem.8b01128, describes a deep learning-based approach. The authors propose extracting the morphological features, as well as features related to the movement of the bacteria, by means of a convolutional neural network (CNN). However, this solution, on the one hand, proves to be highly intensive in terms of computing resources, and, on the other hand, requires an extensive base of learning images in order to train the CNN.

The objective technical problem of the present invention is, therefore, to be able to provide a solution that is both more efficient and less intensive for classifying images of a biological particle.

SUMMARY

According to a first aspect, the present invention relates to a method for classifying a sequence of input images representing a target particle in a sample, the method being characterized in that it comprises implementing, by data processing means of a client, the following steps:
  (b) concatenating said input images of the sequence in the form of a three-dimensional stack;
  (c) directly classifying said three-dimensional stack by means of a convolutional neural network (CNN), with said CNN being composed of a succession of convolutional blocks composed of a '3D' convolutional layer, applying four-dimensional filters to a four-dimensional input feature map so as to generate a four-dimensional output feature map, an activation layer and a 3D pooling layer, and then a flattening layer, and finally one or more fully connected layer(s).

According to advantageous and non-limiting features:

The particles are shown in a homogeneous manner in each input image, in particular centered and aligned in a predetermined direction.

The method comprises a step (a) of extracting an overall image of the sample from each input image, so as to show said target particle in said homogeneous manner.

Step (a) comprises, for each input image, segmenting said overall image so as to detect said target particle in the sample, and then cropping the input image on said detected target particle.

Step (a) comprises acquiring said overall image from an intensity image of the sample (12) acquired by an observation device.

Said three-dimensional stack has two spatial dimensions and the temporal dimension, with said filters and feature maps having said spatial and temporal dimensions as three first dimensions, and a semantic depth as a fourth dimension.

The filters of said 3D convolutional layer have a depth equal to the depth of the input feature map, and the output feature map has a depth equal to the number of filters of the 3D convolutional layer.

Said CNN comprises only two convolutional blocks.

The method comprises a step (a0) of learning, by data processing means of a server, parameters of said classifier from a learning base of previously classified sequences of images of particles in said sample.

According to a second aspect, a system is proposed for classifying a sequence of input images representing a target particle in a sample over time, comprising at least one client comprising data processing means, characterized in that said data processing means are configured to implement:
  concatenating said input images of the sequence in the form of a three-dimensional stack;
  directly classifying said three-dimensional stack by means of a convolutional neural network (CNN), with said CNN being composed of a succession of convolutional blocks composed of a '3D' convolutional layer, applying four-dimensional filters to a four-dimensional input feature map so as to generate a four-dimensional output feature map, an activation layer and a 3D pooling layer, and then a flattening layer, and finally one or more fully connected layer(s).

According to advantageous and non-limiting features, the system further comprises a device for observing said target particle in the sample.

According to a third and a fourth aspect, a computer program product is proposed comprising code instructions for executing a method according to the first aspect for classifying a sequence of input images representing a target particle in a sample; and a storage means is proposed that can be read by an item of computer equipment on which a computer program product comprises code instructions for executing a method according to the first aspect for classifying a sequence of input images representing a target particle in a sample.

BRIEF DESCRIPTION OF THE DRAWINGS

Further features and advantages of the present invention will become apparent upon reading the following description of a preferred embodiment. This description will be provided with reference to the accompanying drawings, in which:

FIG. 5 shows an example of a convolutional neural network architecture used in a preferred embodiment of the method according to the invention.

DETAILED DESCRIPTION

Architecture

The invention relates to a method for classifying a sequence of input images representing a particle 11a-11f present in a sample 12, called target particle. It should be noted that the method can be implemented at the same time for all or some of the particles 11a-11f present in a sample 12, with each being considered to be a target particle in turn.

As will be seen, this method comprises a machine learning component, and in particular a convolutional neural network, CNN.

The input or learning data are of the image type, and represent the target particle 11a-11f in a sample 12 (in other words, it involves images of the sample in which the target particle is visible). Said sequence is made up of a plurality of input images of the same target particle 11a-11f over time. As will be seen, it is possible, if applicable, to have a plurality of sequences of images of particles 11a-11f of the sample 12 as input if several particles are considered.

The sample 12 is made up of a liquid such as water, a buffer solution, a culture medium or a reactive medium (which may or may not include an antibiotic), in which the particles 11a-11f to be observed are located.

As an alternative embodiment, the sample 12 can be in the form of a solid medium, preferably translucent, such as an agar-agar, in which the particles 11a-11f are located. The sample 12 also can be a gaseous medium. The particles 11a-11f can be located inside the medium or even on the surface of the sample 12.

The particles 11a-11f can be microorganisms such as bacteria, fungi or yeasts. This can also include cells, multicellular organisms, or any other particle of the polluting particle type, including dust. Throughout the remainder of the description, the preferred example will be used in which the particle is a bacterium (and, as will be seen, the sample 12 includes an antibiotic). The size of the observed particles 11a-11f varies between 500 nm and several hundred µm, or even a few millimeters.

The "classification" of a sequence of input images involves determining at least one class from among a set of possible descriptive classes of the images. For example, in the case of particles of the bacterium type, it is possible to have a binary classification, i.e., two possible classes of effect, namely "division" or "no division", respectively indicating resistance to an antibiotic or no resistance to an antibiotic. The present invention will not be limited to any kind of particular classification, even if the example of a binary classification of the effect of an antibiotic on said target particle 11a-11f will be mainly described.

Figure 1:
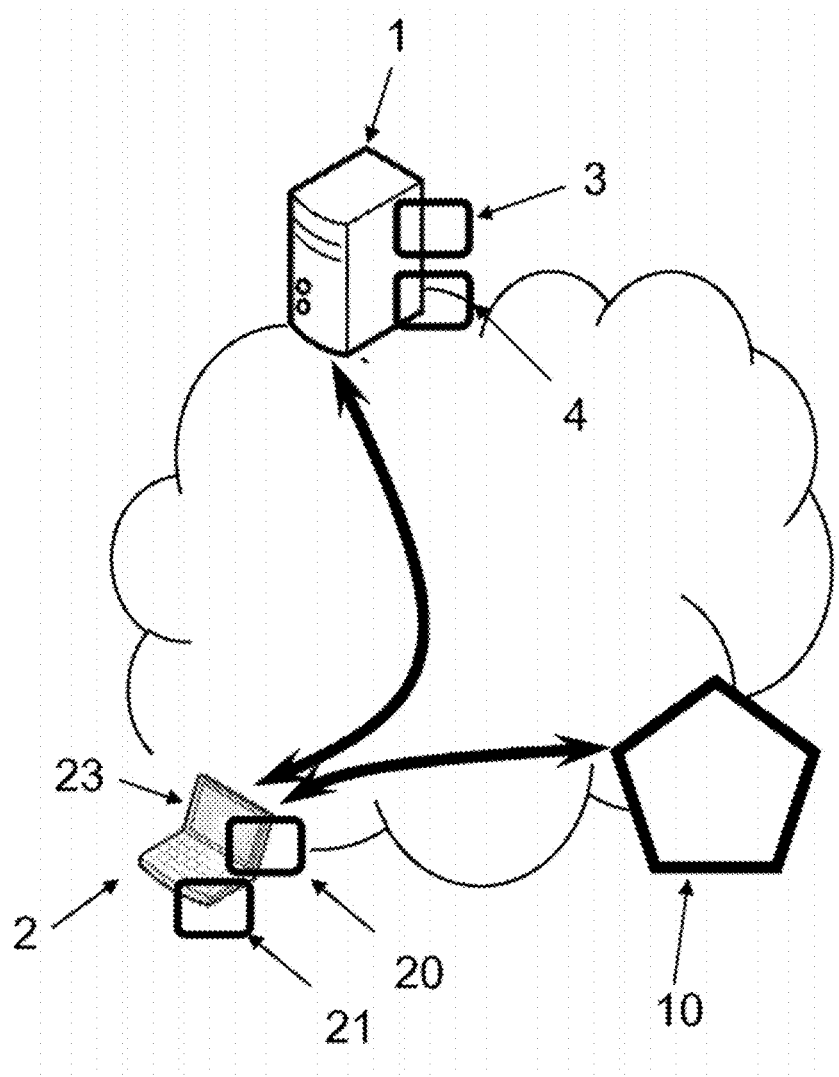
FIG. 1 is a diagram of an architecture for implementing the method according to the invention.

The present methods are implemented within an architecture as shown in FIG. 1, by virtue of a server 1 and a client 2. The server 1 is the learning equipment (implementing the learning method) and the client 2 is an item of operating equipment (implementing the classification method), for example, a terminal of a doctor or a hospital.

It is quite possible for the two items of equipment 1, 2 to be combined, but preferably the server 1 is a remote device, and the client 2 is a consumer device, in particular a desktop computer, a portable device, etc. The client device 2 is advantageously connected to an observation device 10, so as to be able to directly acquire said input image (or, as will be seen hereafter, "raw" acquisition data, such as an overall image of the sample 12 or even electromagnetic matrices), typically for direct processing thereof, alternatively, the input image will be loaded onto the client device 2.

In all cases, each item of equipment 1, 2 is typically remote computing equipment linked to a local network or to a wide area network, such as the Internet, for exchanging data. Each comprises processor-type data processing means 3, 20, and data storage means 4, 21, such as a computer memory, for example, a flash memory or a hard disk. The client 2 typically comprises a user interface 22, such as a screen, for interacting.

The server 1 advantageously stores a learning database, i.e., a set of sequences of images of particles 11a-11f that are already classified (for example, associated with labels indicating "with division" or "without division" indicating the sensitivity or the resistance to the antibiotic) under various conditions (see below). It should be noted that the learning data can be associated with labels defining the test conditions, for example, indicating, for cultures of bacteria, the "strains", "the conditions of the antibiotic", "the time", etc.

Acquisition

Even if, as explained, the present method can directly take any image of the target particle 11a-11f as input, obtained in any way, the present method preferably begins with a step (a) of acquiring the input image from data supplied by an observation device 10.

In a known manner, a person skilled in the art will be able to use digital holographic microscopy (DHM) techniques, particularly as described in international application WO 2017/207184. In particular, an intensity image, called hologram, of the sample 12 can be acquired, which image is not focused on the target particle (referred to as an "out-of-focus" image), and which can be processed by data processing means (integrated in the device 10 or those 20 of the client 2, for example, see below). It is understood that the hologram in a certain manner "represents" all the particles 11a-11f in the sample.

Figure 2:
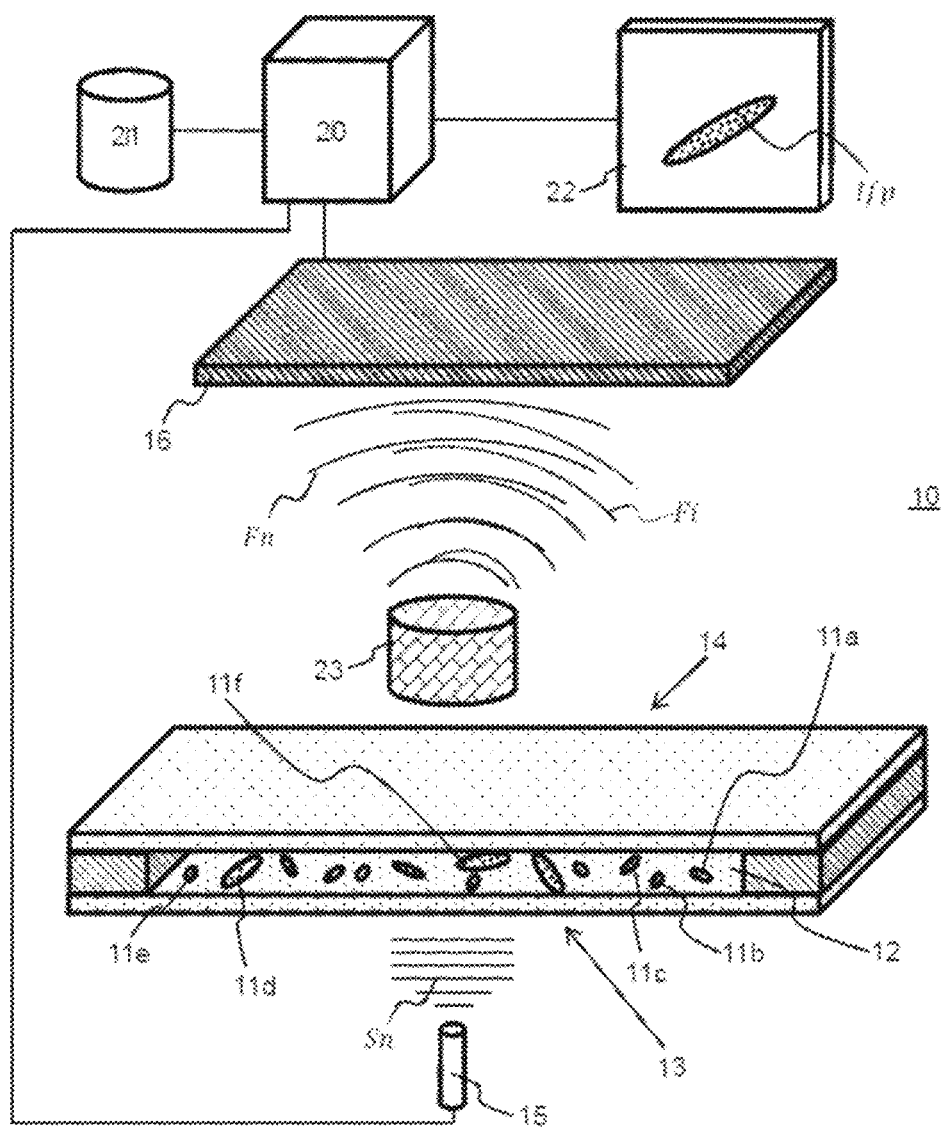
FIG. 2 shows an example of a device for observing particles in a sample used in a preferred embodiment of the method according to the invention.

FIG. 2 illustrates an example of a device 10 for observing a particle 11a-11f present in a sample 12. The sample 12 is disposed between a light source 15, which is spatially and temporally coherent (for example, a laser) or is pseudo-coherent (for example, a light-emitting diode, a laser diode), and a digital sensor 16 sensitive in the spectral range of the light source. Preferably, the light source 15 has a low spectral width, for example, less than 200 nm, less than 100 nm or even less than 25 nm. Throughout the remainder of the description, the central emission wavelength of the light source is referred to, for example, in the visible domain. The light source 15 emits a coherent signal Sn oriented on a first face 13 of the sample, for example, conveyed by a waveguide such as an optical fiber.

The sample 12 (as explained, typically a culture medium) is contained in an analysis chamber, vertically delimited by a lower slide and an upper slide, for example, conventional microscope slides. The analysis chamber is laterally delimited by an adhesive or by any other leaktight material. The lower and upper slides are transparent to the wavelength of the light source 15, with the sample and the chamber allowing through, for example, more than 50% of the wavelength of the light source under normal incidence on the lower slide.

Preferably, the particles 11a-11f are disposed in the sample 12 on the upper slide. To this end, the lower face of the upper slide includes ligands for attaching the particles, for example, polycations (for example, poly-Llysin) within the context of microorganisms. This allows the particles to be contained in a thickness equal to, or close to, the depth of field of the optical system, namely in a thickness of less than 1 mm (for example, tube lens), and preferably less than 100 µm (for example, microscope objective lens). The particles 11a-11f nevertheless can move in the sample 12.

Preferably, the device comprises an optical system 23 formed, for example, by a microscope objective lens and a tube lens, disposed in the air and at a fixed distance from the sample. The optical system 23 is optionally equipped with a filter that can be located in front of the objective lens or between the objective lens and the tube lens. The optical system 23 is characterized by its optical axis, its object plane, also called focusing plane, at a distance from the objective lens, and its image plane, conjugated from the object plane by the optical system. In other words, an object located in the object plane has a corresponding clear image of this object in the image plane, also called focal plane. The optical properties of the system 23 are fixed (for example, fixed focal optic). The object and image planes are orthogonal to the optical axis.

The image sensor 16 is located, facing a second face 14 of the sample, in the focal plane or in the vicinity thereof. The sensor, for example, a CCD or CMOS sensor, comprises a periodic two-dimensional array of sensitive elementary sites, and proximity electronics that adjust the exposure time and the resetting of the sites in a manner per se known. The output signal of an elementary site is dependent on the amount of radiation of the spectral range incident on said site during the exposure time. This signal is then converted, for example, by the proximity electronics, into an image point, or "pixel", of a digital image. The sensor thus produces a digital image in the form of a matrix with C columns and L rows. Each pixel of this matrix, of coordinates (c, l) in the matrix, corresponds, in a manner per se known, to a position of Cartesian coordinates (x(c, l), y(c, l)) in the focal plane of the optical system 23, for example, the position of the center of the rectangular sensitive elementary site.

The pitch and the filling factor of the periodic array are selected in order to comply with the Nyquist-Shannon criterion with respect to the size of the observed particles, so as to define at least two pixels per particle. Thus, the image sensor 16 acquires a transmission image of the sample in the spectral range of the light source.

The image acquired by the image sensor 16 comprises holographic information insofar as it results from the interference between a wave diffracted by the particles 11a-11f and a reference wave that has passed through the sample without having interacted with said sample. Obviously, as described above, it is understood that within the context of a CMOS or CCD sensor, the acquired digital image is an intensity image, with the phase information therefore being coded in this case in this intensity image.

Alternatively, the coherent signal Sn originating from the light source 15 can be divided into two components, for example, by means of a semi-transparent slide. The first component then acts as a reference wave and the second component is diffracted by the sample 12, with the image in the image plane of the optical system 23 resulting from the interference between the diffracted wave and the reference wave.

Figure 3A:
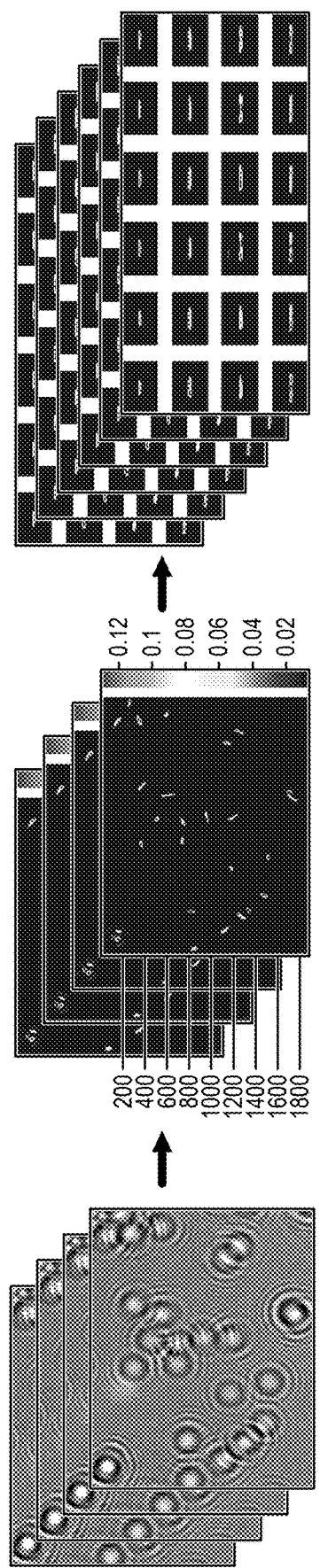
FIG. 3a illustrates the acquisition of the input image in an embodiment of the method according to the invention.

With reference to FIG. 3a, in step (a) it is possible to reconstruct a plurality of overall images of the sample 12 from the hologram, then to extract each input image from an overall image of the sample.

Indeed, it is understood that the target particle 11a-11f must be represented in a homogeneous manner in each input image, particularly centered and aligned in a predetermined direction (for example, the horizontal direction). The input images also must have a standardized size (it is also desirable for only the target particle 11a-11f to be seen in the input image). The input image is thus referred to as "thumbnail", and a size of 250×250 pixels, for example, can be defined. Insofar as a sequence of input images is desired, one image per minute is taken, for example, over a time interval of 120 minutes, a sequence of 120 input images is thus obtained.

The reconstruction of each overall image is implemented, as explained, by data processing means of the device 10 or those 20 of the client 2.

Typically, a series of complex matrices, called "electromagnetic matrices", is constructed (for an acquisition instant), modelling, based on the intensity image of the sample 12 (the hologram), the light wavefront propagated along the optical axis for a plurality of deviations with respect to the focusing plane of the optical system 23, and in particular deviations positioned in the sample.

These matrices can be projected into the real space (for example, via the Hermitian standard), so as to form a stack of overall images at various focusing distances.

From the above, it is possible to determine an average focusing distance (and to select the corresponding overall image, or to re-compute it from the hologram), or to determine an optimal focusing distance for the target particle (and again select the corresponding overall image, or to re-compute it from the hologram).

Figure 3B:
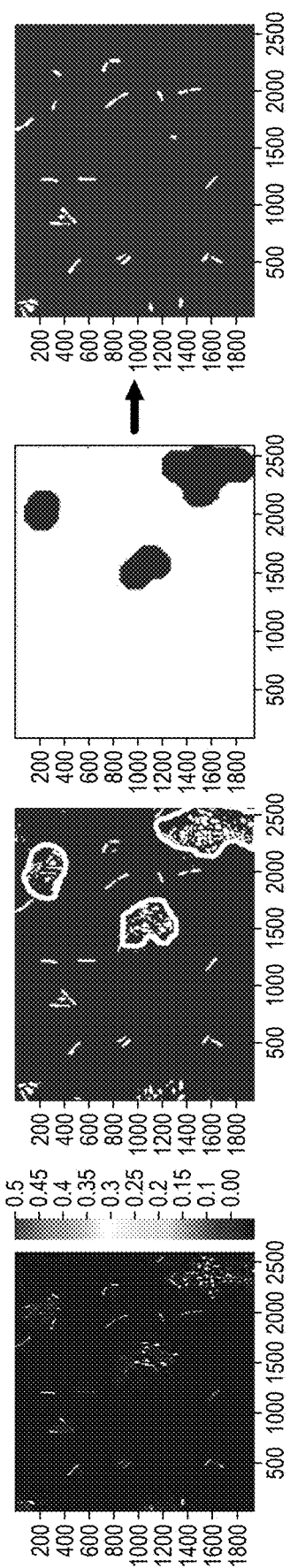
FIG. 3b illustrates the acquisition of the input image in a preferred embodiment of the method according to the invention.

In all cases, with reference to FIG. 3b, step (a) advantageously includes segmenting said overall images so as to detect said target particle in the sample, and then includes the cropping. In particular, each input image can be extracted from one of the overall images of the sample, so as to represent said target particle in said homogenous manner.

In general, the segmentation allows all the particles of interest to be detected, by removing any artifacts, such as filaments or micro-colonies, so as to improve the one or more overall image(s), then one of the particles detected as being the target particle is selected, and the corresponding thumbnail is extracted. As explained, this work can be undertaken for all the detected particles.

The segmentation can be implemented in any known manner. In the example of FIG. 3b, fine segmentation is carried out initially in order to eliminate the artifacts, then coarser segmentation is implemented, in this case in order to detect the particles 11a-11f. A person skilled in the art could use any known segmentation technique.

In order to obtain the sequence of input images for a target particle 11a-11f, tracking techniques can be implemented in order to track any movements of the particle from one overall image to the next.

It should be noted that all the input images acquired for a sample (for several or even all the particles of the sample 12, and doing so over time) can be pooled in order to form a descriptive base of the sample 12 (in other words a descriptive base of the experiment), as can be seen on the right of FIG. 3a, particularly copied onto the storage means 21 of the client 2. Reference is made to a "field" level, as opposed to the "particle" level. For example, if the particles 11a-11f are bacteria and the sample 12 contains or does not contain an antibiotic, this descriptive base contains all the information concerning the growth, the morphology, the internal structure and the optical properties of these bacteria over the entire field of the acquisition. As will be seen, this descriptive base can be transmitted to the server 1 in order to be included in said learning base.

Stacking

As will be seen, the present method is different in that it can work directly on a sequence of input images, without requiring or working image-by-image, nor extracting feature maps in an intermediate manner. Moreover, it will be seen that a CNN that is very simple and light is sufficient for performing a reliable and efficient classification.

Figure 4:
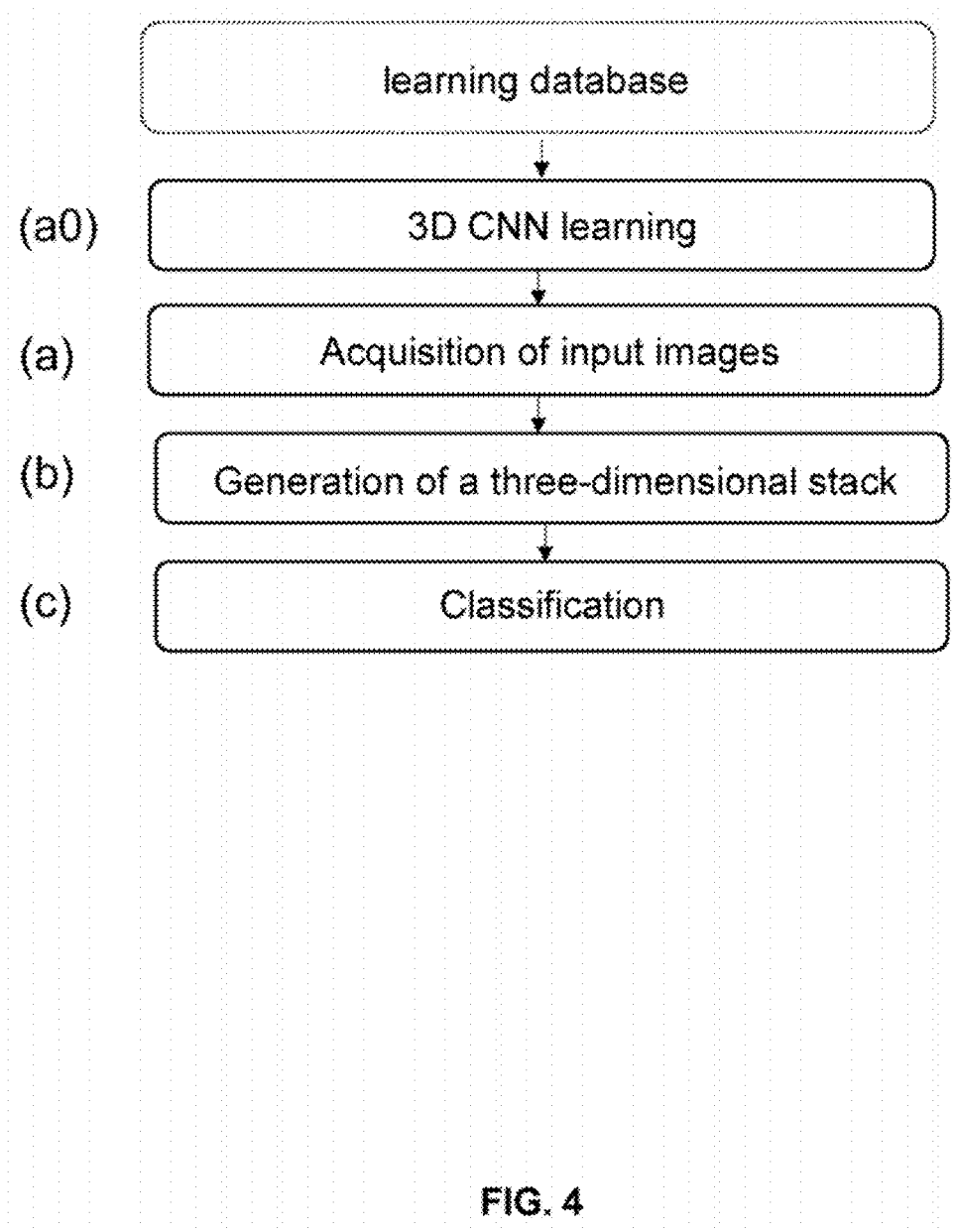
FIG. 4 shows the steps of a preferred embodiment of the method according to the invention.

With reference to FIG. 4, the present method comprises a step (b) of concatenating said input images of the sequence in the form of a three-dimensional stack, in other words a 3D "stack". More specifically, the input images all have the same size and form a sequence of matrices, they therefore simply need to be stacked in the order of the input images in order to obtain the three-dimensional stack.

This three-dimensional stack therefore can be seen as an image having as many channels as acquisition time instants, even if, as will be seen below, the present method will process this stack, in a highly original manner, as a single three-dimensional object (for example, with a size of 250× 250×120 if there are input images of size 250×250 and for one image acquired per minute for 120 minutes) with a single channel, in the same way that an RGB image is a two-dimensional object with three channels. The first two dimensions conventionally are the spatial dimensions (i.e., the size of the input images) and the third dimension is the "temporal" dimension (acquisition instant).

Preferably, step (b) comprises down-sampling said three-dimensional stack, i.e., reducing the size of the input.

Said down-sampling can be implemented on the temporal dimension of the stack and/or its spatial dimensions, preferably both.

In particular:
- with respect to the temporal dimension, it can be reduced by cutting the acquisition period into n intervals and by selecting the n+1 images of the sequence corresponding to the ends of these intervals, for example, by keeping only 5 images from a sequence of 120 images, which amounts to taking one image every 120/4=30 minutes (in particular, the images acquired at the end of 1, 30, 60, 90 and 120 minutes). However, it is still possible to select the images in an uneven manner (for example, by selecting more images at the beginning of the acquisition period than at the end);
- with respect to the spatial dimensions, they can be reduced using any image down-sampling technique with a given sampling factor (on each axis in order to maintain the proportions), for example, a factor of 2.

Implementing the aforementioned two down-samplings in combination, results in a transition from a stack of size 250×250×120 to a stack of size 125×125×5 (the size of the stack is reduced almost by a factor of 100).

It should be noted that this down-sampling in fact can occur prior to the generation of the stack (by selecting and modifying the input images).

Classification

In a step (c), said three-dimensional stack is classified directly by means of a suitable convolutional neural network, called "3D CNN", due to its ability to process the three-dimensional objects that are the stacks. Indeed, it is important to understand, as mentioned, that the three-dimensional stack is processed by the CNN as a single three-dimensional object (i.e., with a single channel), and not as a two-dimensional object with several channels (as is the case, for example, for an RGB image).

The term direct classification, or "end-to-end", is understood to mean without separate extraction of at least one feature map of said target particle $11a$-$11f$: it is understood that the CNN naturally has internal states in the form of feature maps, but these are never sent outside the CNN, with said CNN having the result of the classification as the only output.

By way of a reminder, in general, the CNNs are particularly suitable for vision tasks, and more specifically for image classification. Generally, a CNN uses a plurality of convolutional layers, and the present 3D CNN uses at least one 3D convolutional layer that models the spatio-temporal dependency between the various input images.

A "3D convolutional layer" is understood to mean a convolutional layer applying four-dimensional filters, and that is thus able to work on a plurality of channels of stacks that are already three-dimensional, in other words a four-dimensional feature map. In other words, the 3D convolutional layer applies four-dimensional filters to a four-dimensional input feature map so as to generate a four-dimensional output feature map. The fourth and last dimension is the semantic depth, as in any feature map.

This should be differentiated from conventional convolutional layers, which are only able to work on three-dimensional feature maps representing several channels of two-dimensional objects (images).

This notion of 3D convolution can appear to be counterintuitive, but it generalizes the notion of a convolutional layer that only anticipates a plurality of "filters" being applied with a depth equal to the number of channels of the input (i.e., the depth of the input feature map), by scanning them over all the dimensions of the input (in 2D for an image), with the number of filters defining the output depth.

The 3D convolution referred to herein therefore applies four-dimensional filters with a depth that is equal to the number of channels of three-dimensional stacks at the input, and scans these filters over the entire volume of a three-dimensional stack, and therefore the two spatial dimensions but also the temporal dimension, i.e., in 3D (hence the designation of 3D convolution). One three-dimensional stack is thus acquired per filter, i.e., a four-dimensional feature map. In a conventional convolutional layer, using a large number of filters definitely allows the semantic depth at the output to be increased (the number of channels), but there will always be a three-dimensional feature map.

It is understood that a 3D convolutional layer remains heavier and requires greater computing power, but, as explained, a very simple architecture (and much simpler than known CNNs, such as VGG616) is sufficient. FIG. 5 shows the architecture of an embodiment of the present 3D CNN.

Conventionally, this architecture advantageously comprises a succession of 'convolutional' blocks made up of a 3D convolutional layer, an activation layer (for example, the ReLU function) in order to increase the depth of the feature maps, and a 3D pooling layer allowing the size of the feature map to be reduced (generally by a factor of 2). It is noteworthy that two convolutional blocks can suffice, so that, highly preferably, the present 3D CNN includes only two convolutional blocks.

A "3D pooling layer" is understood to mean, as for the 3D convolution, a layer capable of working on four-dimensional feature maps, having one or more channels of stacks that are already three-dimensional. In other words, the size reduction is over all the dimensions of a three-dimensional stack, i.e., the first three dimensions of a four-dimensional feature map.

Throughout the remainder of the present description, a distinction will be clearly made between the number of "dimensions" of the feature maps, in the geometric direction, that is to say, the number of independent directions in which these cards extend (for example, a vector is a 1-dimensional object, an image is 2-dimensional, and the present feature maps are 4-dimensional), and the number of "variables" of these feature maps, in other words, the size in each dimension, i.e., the number of independent degrees of freedom (which in practice corresponds to the notion of a dimension in a vector space, more specifically, the set of feature maps having a given number of variables constitutes a vector space with dimensions equal to this number of variables).

Thus, in the example of FIG. 5, the 3D CNN begins, as explained, with 6 layers distributed in 2 blocks. The first takes the three-dimensional stack with a single channel as input (thus forming an object of size 125×125×5×1 when it is advantageously down-sampled as proposed above), and includes a convolution+ReLU sequence (a first 3D convolutional layer, and an activation layer with a ReLU function) increasing the depth to 30, then a max pooling layer (it is also possible to use overall average pooling), with a 62×62×2×30 feature map as output (the 3D pooling layer works as explained on the three dimensions and not only the two spatial dimensions; thus involving division by two, including the temporal dimension).

In the example shown, the first 3D convolutional layer uses 30 filters with a dimension of 3×3×3×1, and thus requires ((3*3*3*1)+1)*30=570 parameters.

The second block has an architecture identical to the first block and generates, as output from a new convolution+ReLU set (a second 3D convolutional layer, and an activation layer with a ReLU function), a 62×62×2×60 (doubled depth) feature map and, as output from the max pooling layer, a 12×12×1×60 feature map (it should be noted that the reduction in spatial size in this case is by a factor of five, but the reduction in temporal size is always by a factor of two).

In this case, the second 3D convolutional layer uses 60 filters with a dimension of 3×3×3×30, and thus requires ((3*3*3*30)+1)*60=32,460 parameters.

At the output of the last convolutional block (in this case, the second), the 3D CNN advantageously comprises a "flattening" layer converting the "final" feature map (containing the "deepest" information) at the output of this block into a vector (1-dimensional object). Thus, for example, the 12×12×1×60 feature map transitions to a 12*12*1*60=8,640 size vector. It will be understood that there is no limit to any map/filter sizes on any level, and that the sizes mentioned above are only examples.

Finally, in a conventional manner, on completion there are one or more fully connected layer(s) (FC, or "dense" layers, as indicated in FIG. 5) and optionally a final activation layer, for example, softmax. In the example shown, a first layer FC converts the vector of size 8,640 into a smaller vector of size 100 (which requires (8,640+1)*100=864,100 parameters), and a second layer FC converts the vector of size 8,640 into a final vector of size 2 (which requires (100+1)*2=202 parameters).

Preferably, the 3D CNN is made up of (i.e., includes exactly) a sequence of convolutional blocks, then a flattening layer, and finally one or more fully connected layer(s).

This final part of the 3D CNN returns the expected result, in this case the class of the input image sequence (the vector of size 2 corresponds to a binary result).

Therefore, it can be seen that the total number of parameters is less than 900,000, which is remarkably low for a CNN (commonly several tens of millions of parameters), in particular in view of the fact that the input data are sequences of images that are already big. The present 3D CNN therefore can be used by multiple clients 2, including those with modest computing resources.

Preferably, the method can comprise a step (a0) of learning, by the data processing means 3 of the server 1, from a learning base, the parameters of the 3D CNN. Indeed, this step is typically implemented considerably upstream, in particular by the remote server 1. As explained, the learning base can comprise a certain amount of learning data, in particular sequences of images associated with their class (for example, "division" or "no division" for binary classification).

Training the 3D CNN can be carried out in a conventional manner. The learning cost function can be made up of an attachment to the conventional "cross-entropy" data to be minimized via a gradient descent algorithm.

In all the embodiments, the learned parameters of the CNN can be stored, if applicable, on data storage means 21 of the client 2 for use in classification. It should be noted that the same CNN can be embedded on multiple clients 2, only one learning phase is necessary.

Computer Program Product

According to a second and a third aspect, the invention relates to a computer program product comprising code instructions for executing (in particular on the data processing means 3, 20 of the server 1 and/or of the client 2) a method for classifying an input image sequence representing a target particle 11a-11f in a sample 12, as well as storage means that can be read by an item of computer equipment (a memory 4, 21 of the server 1 and/or of the client 2) on which this computer program product is found.

The invention claimed is:

1. A method for classifying a sequence of input images representing a target particle in a sample over time, the method being characterized in that it comprises implementing, by data processing means of a client, the following steps:
(b) concatenating said input images of the sequence in the form of a three-dimensional stack;
(c) directly classifying said three-dimensional stack by means of a convolutional neural network (CNN), with said CNN being composed of a succession of convolutional blocks composed of a '3D' convolutional layer, applying four-dimensional filters to a four-dimensional input feature map so as to generate a four-dimensional output feature map, an activation layer and a 3D pooling layer, and then a flattening layer, and finally one or more fully connected layer(s).

2. The method as claimed in claim 1, wherein the particles are shown in a homogeneous manner in each input image, in particular centered and aligned in a predetermined direction.

3. The method as claimed in claim 2, comprising a step (a) of extracting an overall image of the sample from each input image, so as to show said target particle in said homogeneous manner.

4. The method as claimed in claim 3, wherein said extracting step (a) comprises, for each input image, segmenting said overall image so as to detect said target particle in the sample, and then cropping the input image on said detected target particle.

5. The method as claimed in claim 3, wherein step (a) comprises acquiring said overall image from an intensity image of the sample acquired by an observation device.

6. The method as claimed in claim 1, wherein said three-dimensional stack has two spatial dimensions and the temporal dimension, with said filters and feature maps having said spatial and temporal dimensions as three first dimensions, and a semantic depth as a fourth dimension.

7. The method as claimed in claim 6, wherein the filters of said 3D convolutional layer have a depth equal to the depth of the input feature map, and the output feature map has a depth equal to the number of filters of the 3D convolutional layer.

8. The method as claimed in claim 1, wherein said CNN comprises only two convolutional blocks.

9. The method as claimed in claim 1, comprising a step of learning, by data processing means of a server, parameters of said CNN from a learning base of previously classified sequences of images of particles in said sample.

10. A system for classifying a sequence of input images representing a target particle in a sample over time, comprising at least one client comprising data processing means, characterized in that said data processing means are configured to implement:
concatenating said input images of the sequence in the form of a three-dimensional stack;
directly classifying said three-dimensional stack by means of a convolutional neural network (CNN), with said CNN being composed of a succession of convolutional blocks composed of a '3D' convolutional layer, applying four-dimensional filters to a four-dimensional input feature map so as to generate a four-dimensional output feature map, an activation layer and a 3D pooling layer, and then a flattening layer, and finally one or more fully connected layer(s).

11. The system as claimed in claim 10, further comprising a device for observing said target particle in the sample.

12. A computer program product stored in non-transitory memory, comprising code instructions for executing a method as claimed in claim 1 for classifying a sequence of input images representing a target particle in a sample over time, when said program is executed on a computer.

* * * * *